United States Patent [19]

Noda

[11] 4,078,597

[45] Mar. 14, 1978

[54] TIRE AND WHEEL ASSEMBLIES

[75] Inventor: Sozi Noda, Takarazuka, Japan

[73] Assignee: Sumitomo Rubber Industries, Ltd., Kobe, Japan

[21] Appl. No.: 635,347

[22] Filed: Nov. 26, 1975

[30] Foreign Application Priority Data

Jan. 21, 1975 Japan .................................. 50-9562

[51] Int. Cl.² ........................... B60C 5/04; B60C 5/08
[52] U.S. Cl. ......................... 152/381.2 WF; 152/340; 152/379.2 R
[58] Field of Search ........... 152/339, 340, 331, 379 R, 152/379 A, 381 R, 381 A, 399, 400, 381 WF

[56] References Cited

U.S. PATENT DOCUMENTS

| 1,298,661 | 4/1919 | Case | 152/339 |
| 1,686,977 | 10/1928 | Littman | 152/400 |
| 2,233,004 | 2/1941 | Fisher | 152/339 |
| 2,253,746 | 8/1941 | Zimmerman | 152/339 |
| 2,554,815 | 5/1951 | Church | 152/339 |

FOREIGN PATENT DOCUMENTS 294,192 7/1928 United Kingdom ............ 152/381 R

Primary Examiner—Drayton E. Hoffman
Assistant Examiner—Randolph A. Reese
Attorney, Agent, or Firm—Birch, Stewart, Kolasch and Birch

[57] ABSTRACT

A tire and wheel assembly which comprises a pneumatic tubeless tire mounted on a wheel having side flanges and a circumferentially extending, radially inwardly depressed well portion. A substantially flexible inflatable tubular ring is lodged in the rim well and, when inflated, acts to prevent one or both of the bead portions of the pneumatic tire from being displaced and falling into the rim well when the pneumatic tire goes flat.

3 Claims, 16 Drawing Figures

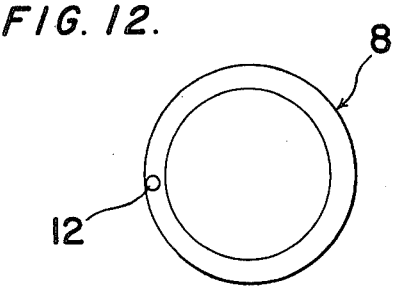
FIG. 12.
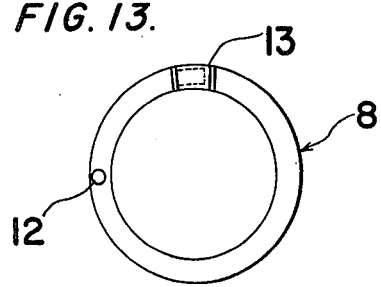
FIG. 13.
FIG. 14.
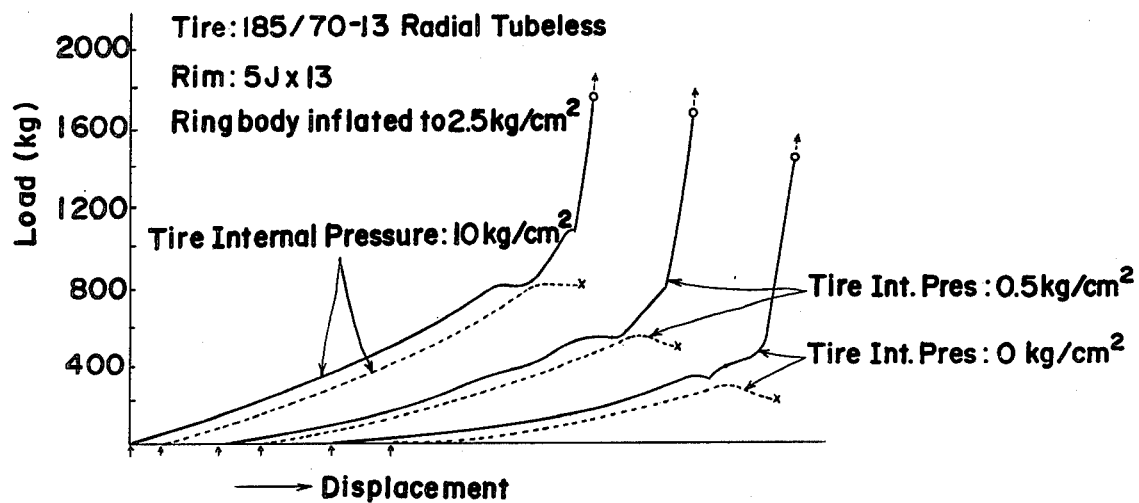
FIG. 15. PRIOR ART
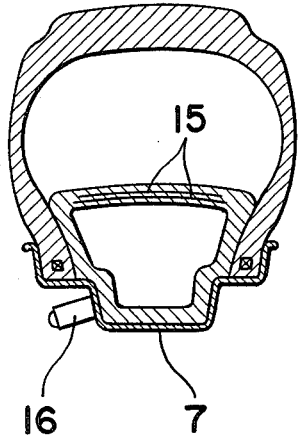
FIG. 16. PRIOR ART
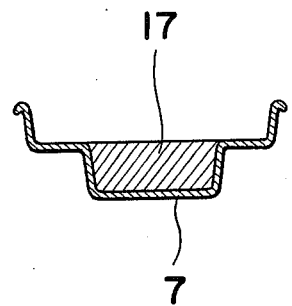

TIRE AND WHEEL ASSEMBLIES

The present invention generally relates to tire and wheel assemblies and, more particularly, to means circumferentially installed in a rim well of the wheel structure for preventing one or both of bead portions of the tire from being displaced into the rim well when the tire is deflated and also avoiding the leakage of air present inside the pneumatic tire.

The present invention is particularly, but not exclusively, applicable to a vehicle wheel structure having a tubeless pneumatic tire mounted thereon.

As is well known to those skilled in the art, a vehicle wheel structure generally comprises a hub having an axles bearing formed at the center thereof, and a rim formed on the outer periphery of the hub. The rim includes a radially inwardly recessed portion, that is, a rim well, a flat side portion on each side of the rim well with the plane thereof being substantially perpendicular to the plane of the hub, and a rim flange integral with and outwardly extending from each of the flat side portions in a direction substantially parallel to the plane of the hub, said flat side portions and said rim flanges defining respective bead seats which are adapted to receive the opposed bead portions of a pneumatic tire to permit the latter to assume a definite position around the wheel structure.

In some types of wheel structures, the hub is constituted by a plurality of radially outwardly extending spokes, it being understood that the present invention is also applicable to such type of wheel structure.

In any event, it has often been experienced that, when a pneumatic tire is punctured during its operation with consequent reduction of the internal pneumatic pressure thereof to a certain extent, at least one of the bead portions of the pneumatic tire, which have been seated in tight contact with and held flat against the opposed rim flanges of the wheel structure, tend to displace in a direction towards the other of the bead portions and to subsequently fall into the rim well. With the tubeless pneumatic tire, once this occurs, the residual internal pneumatic pressure is rapidly exhausted to the atmosphere and, in an extreme case, the tire comes, therefore, instantaneously off the wheel structure which can cause traffic accidents.

In order to avoid the above described defect, various types of combined wheel and tire assemblies have heretofore been proposed. One of them utilizes a metallic band which is mounted on the wheel structure so as to overlay and, therefore, seal the rim well so that the bead portion of the pneumatic tire will not fall into the rim well. Another one of them utilizes a block of hard plastic material such as urethane resin, designated by 17 in FIG. 16 of the accompanying drawing, which is filled into the rim well 7, thereby avoiding a possible fall-in of the displaced bead portion of the tire.

A double-tired wheel structure has also been employed such as shown in FIG. 15 wherein reference numerals 15 and 16 represent layers of breaker and a special valve.

However, where the metallic band is employed, the metallic band is hard to handle and tends to damage the surface of each of the bead portions of the tire which contacts the bead seat. On the other hand, in the second mentioned arrangement wherein the hard plastic block 17 is employed, since the plastic material forming the block 17 sticks, or otherwise is bonded, to the surrounding wall which defines the rim well 7 in the wheel structure, complicated procedures are required to remove the filled plastic block out of the rim well and, accordingly, removal of the tire from the wheel structure is hard to perform. In addition, when one of the bead portions of the tire is actually displaced towards the plastic block filled in the rim well, it is difficult to retain the residual internal pneumatic pressure within the tire.

Accordingly, an essential object of the present invention is to provide a combined wheel and tire assembly wherein means is provided for substantially avoiding the displacement of at least one of the bead portions of the pneumatic tire, thereby substantially eliminating the disadvantages and inconveniences inherent in the above described prior art arrangements.

Another important object of the present invention is to provide a combined wheel and tire assembly wherein the possibility of leakage of air, which may otherwise occur from between the displaced bead portion of the tire and the rim of the wheel structure, is substantially eliminated.

It is a related object of the present invention to provide a flexible inflatable ring body adapted to be installed in the rim well of any type of commercially available wheel structures for preventing one or both of bead portions of the tire from displacing in a direction relative to each other.

The present invention is featured in the use of a substantially endless inflatable ring body having at least one normally flattened, circumferentially extending cavity, which endless inflatable ring body is installed in the rim well. So long as the ring body is not inflated, the cavity in the ring body is flattened or collapsed, substantially representing a line or crevice in cross section, with a portion of the ring body above the flattened cavity held substantially flush with the plane of any of the flat side portions of the rim of the wheel structure. On the other hand, when the ring body is inflated by the application of pneumatic medium, such as air, through a valve into the cavity which at this time expands in volume, that portion of the ring body is outwardly enlarged diverting from the plane of any of the flat side portions of the rim with the ring body assuming such a cross sectional shape as to provide a barrier acting to prevent at least one of the bead portions of the tire from being laterally displaced into the rim well.

These and other objects and features of the present invention will become apparent from the following description taken in conjunction with preferred embodiments thereof with reference to the accompanying drawings, in which:

FIGS. 12 and 13 are side elevational views, showing different types of ring body which can be employed in the wheel and tire assembly of the present invention;

FIG. 14 is a graph showing the degree of displacement of one of the bead portions of a tire with respect to a particular load applied to one of the side walls of the tire adjacent said one bead portion;

FIG. 15 is a view similar to FIG. 1, showing a conventional double-tired construction, and FIG. 16 is a cross sectional view of a rim of a wheel structure wherein a plastic block is filled in the rim well according to the prior art arrangement.

Before the description of the present invention proceeds, it is to be noted that like parts are designated by like reference numerals throughout the accompanying drawings for the sake of brevity.

Furthermore, it should be understood that the detailed description and specific examples, while indicating preferred embodiments of the invention, are given by way of illustration only, since various changes and modifications within the spirit and scope of the invention will become apparent to those skilled in the art from this detailed description, and are therefore intended to be encompassed therein.

Figure 1:
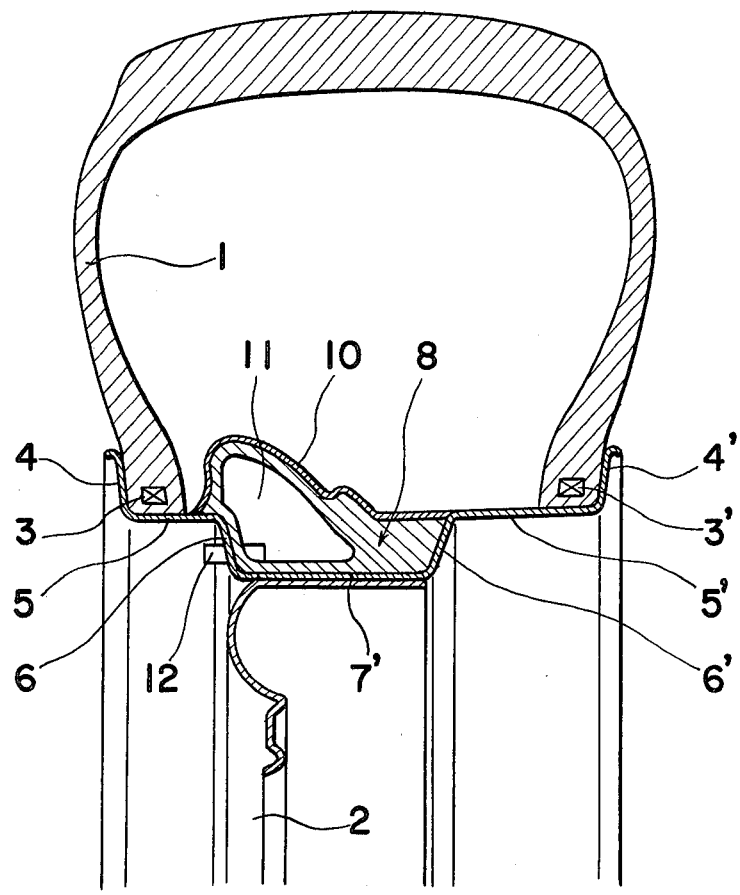
FIG. 1 is a cross sectional view of a combined wheel and tire assembly according to one embodiment of the present invention, which cross sectional view is taken perpendicular to the midcircumferential plane of the assembly.

Referring now to FIG. 1, a tubeless pneumatic tire, generally indicated by 1 and having a pair of opposed bead portions in which respective beads 3 and 3' extend circumferentially, is shown as mounted on a wheel structure.

The wheel structure shown comprises a hub 2 having an axle bearing (not shown) through which the wheel structure with the tire thereon is mounted on one of the wheel axles of a vehicle, and a rim assembly rigidly mounted on, or otherwise integrally formed with, the outer peripheral portion of the hub 2. The rim assembly includes a radially inwardly recessed portion, that is, a rim well, which is defined by a base wall 7' and a pair of opposed side walls 6 and 6' which substantially radiates outwardly and contiguously extend from respective side edges of the base wall 7', a pair of opposed rim flanges 4 and 4' and a pair of opposed flat side portions 5 and 5' which are respectively formed between the rim flanges 4 and 4' and the side walls 6 and 6'.

The pneumatic tire 1 is mounted on the wheel structure in such a manner that the respective bead portions thereof are held in tight contact with the flat side portions 5 and 5' on one hand and held flat against the rim flanges 4 and 4' on the other hand by the effect of elasticity of the tire 1.

The arrangement so far described is well known to those skilled in the art and, therefore, further details of the tire and the wheel structure will not be referred to in the subsequent description for the sake of brevity.

A flexible inflatable ring body, generally indicated by 8 and shown as installed in the rim well 7 according to the teachings of the present invention may be made either in the form of an endless body as manufactured or by connecting to each other the opposite ends of a substantially elongated body which ultimately forms the ring body 8 as will be described later in more detail.

Figure 2:
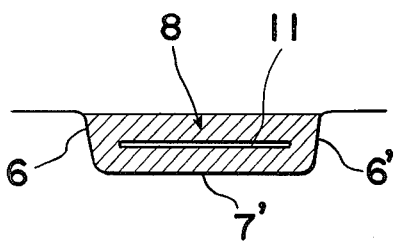
FIGS. 2, 4, 6, 8, 10 and 11 are cross sectional views of a portion of the combined wheel and tire assembly, showing various modifications of a substantially endless inflatable ring body in a deflated condition.
Figure 3:
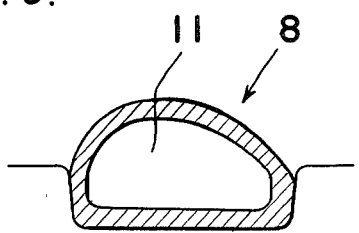
FIGS. 3, 5, 7 and 9 are views similar to FIGS. 2, 4, 6 and 8, respectively, illustrating the ring body inflated.

With reference to FIGS. 2 and 3, the ring body 8 has formed therein a cavity 11 extending over the substantially entire circumference of the ring body 8. The cavity 11 when the ring body 8 is not inflated is flattened or collapsed representing a line or crevice as shown in FIG. 2, which line or crevice extends between the walls 6 and 6' in substantially parallel relation to the base wall 7'. On the other hand, when the ring body 8 is inflated with pneumatic medium, such as air, supplied into the cavity 11 through a valve 12 (FIG. 1), that portion of the ring body 8 which has been situated immediately above the line or crevice and which is opposed to a portion of said ring body 8 held in contact with the walls 6, 6' and 7' is outwardly enlarged, as shown in FIG. 3, diverting from the plane of any of the flat side portions 5 and 5' of the rim of the wheel structure.

It will readily be seen that the enlarged portion of the inflated ring body 8 acts to prevent at least one of the bead portions of the tire from being displaced into the rim well 7.

Figure 4:
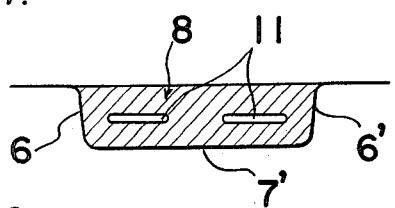
Figure 6:
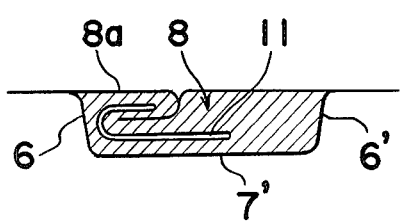
Figure 8:
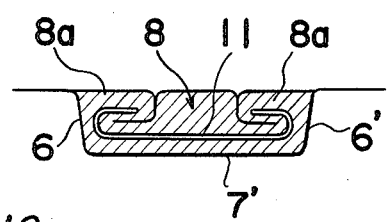

The inflatable ring body 8 when not inflated may have a cross sectional shape such as shown in any of FIGS. 4, 6 and 8.

Figure 5:
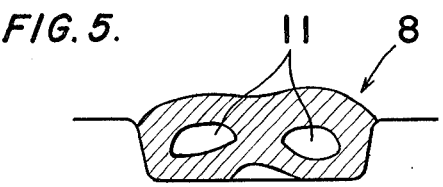

Specifically, in the example of FIG. 4, two cavities 11 are formed in the ring body 8 in juxtaposed relation to each other so that, when the ring body 8 is inflated with the pneumatic medium supplied into the cavities 11, the ring body 8 represents a cross sectional shape substantially similar to the shape of a spectacle frame as shown in FIG. 5.

Figure 7:
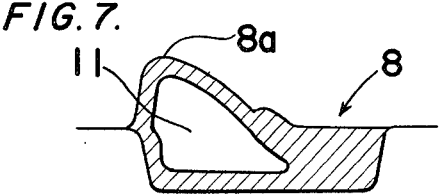

In the example shown in FIG. 6, the ring body 8 has a tongue-like portion 8a integral with and contiguous from one side edge of the ring body 8, which tongue-like portion 8a is, when the ring body 8 is not inflated, so folded that the ring body 8 assumes a cross sectional shape complemental to the cross sectional area of the rim well. The line or crevice, which is represented by the cavity 11 when the ring body 8 is not inflated, extends from a portion substantially intermediate between the side walls 6 and 6' towards a portion adjacent the wall 6 where said line or crevice is turned to extend in the folded tongue-like portion 8a, so that said ring body, when inflated, assumes a substantially triangular cross sectional shape, as shown in FIG. 7, sufficient to prevent one of the bead portions of the tire adjacent the tongue-like portion 8a from being displaced into the rim well.

Figure 9:
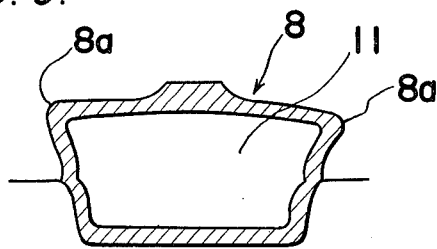

The example of FIG. 8 is such that two tongue-like portions 8a are formed at respective side edges of the ring body 8 in a similar fashion to the tongue-like portion 8a shown in FIG. 6. Therefore, it will readily be seen that, when the ring body of FIG. 8 is inflated, it assumes a cross sectional shape as shown in FIG. 9 sufficient to prevent both of the bead portions of the tire from being displaced into the rim well.

Figure 10:
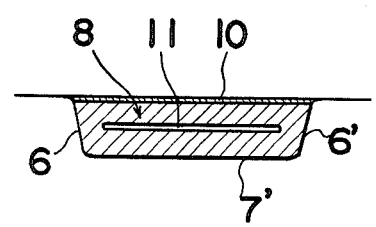
Figure 11:
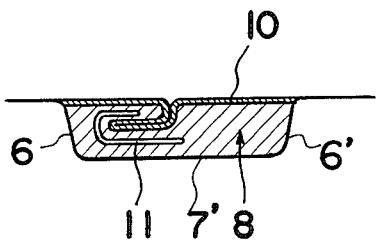

An outer surface of the ring body 8 opposed to the walls 6, 6' and 7' defining the rim well may be reinforced by applying or embedding a reinforcement layer made up of cords of either an organic material such as nylon, polyester of Kebler or an inorganic material such as glass fiber or steel. Where a layer of fiber cords is employed as a reinforcement carcass for the purpose of this reinforcement, the cords are to be laid on a bias relative to the circumferential direction of the ring body 8. The cross sectional shape of the ring body 8 if the reinforcement carcass 10 is employed may be such as shown in any of FIGS. 10 and 11, but is not limited thereto.

Referring now to FIG. 12, where the ring body 8 is manufactured from an endless body, the valve 12 through which the pneumatic medium is supplied into the cavity or cavities 11 is fitted at any position on the circumference of the ring body in any known manner.

On the other hand, where the ring body 8 is manufactured from a substantially elongated body, connection of the opposite ends of the elongated body to render it substantially endless may be achieved at 13 by any customarily employed connecting technique, for example, by means of catch engagement or thread engagement.

Material for the ring body 8 may be any known rubber material, preferably such a rubber material as will not permit passage of pneumatic medium therethrough. Where the ring body 8 is desired to have a relatively high physical strength, any plastic material such as hard urethane resin may be employed as a material therefor.

The ring body 8 of the above construction can be manufactured by the use of any known method practised in the manufacture of rubber products such as including calendaring, molding and vulcanizing.

Installation of the ring body 8 in the rim well of the wheel structure can be carried out at the time when the tire is to be mounted on the same wheel structure. More particularly, the ring body 8 is mounted on the wheel structure so as to seat in the rim well while one of the bead portions of the tire is pressed towards the other of the bead portions by the application of an external pushing force to the side wall of the tire adjacent said one bead portion. Thereafter, the bead portion of the tire to which the pushing force has been applied to displace it towards the other bead portion as described above is allowed by the effect of its own elasticity to pass over the ring body 8, already seated within the rim well, and to be subsequently held flat against the corresponding rim flange 4 or 4'.

Supply of the pneumatic medium into the cavity or cavities 11 through the valve 12 results in the inflated ring body 8, which represents its cross sectional shape as shown in any of FIGS. 3, 5, 7 and 9, with that portion of the ring body opposed to the walls 6, 6' and 7' being outwardly enlarged so that one or both of the bead portions of the tire are held between the rim flange or flanges 4 and 4' and one or both of lateral sides of enlarged portion of the tire. Therefore, it is clear that the fallin of at least one of the bead portions of the tire into the rim well can advantageously be avoided.

Where the tire is to be removed from the wheel structure, it can readily be done by following a method adverse to the above described procedure of mounting of the tire on the wheel structure.

The wheel and tire assembly according to the present invention wherein the ring body 8 of the construction shown in FIGS. 6 and 7 were tested according to MVSS 109 as to the separation of one of the bead portions of the tire from the corresponding rim flange of the wheel structure. The result is such as shown in the graph of FIG. 14. In the graph of FIG. 14, solid lines represent respective performance curves of wheel and tire assemblies each having the ring body mounted therein while broken lines represent respective performance curves of wheel and tire assemblies with no ring body mounted thereon.

The marking "o" at one end of each of the solid lines in the graph of FIG. 14 represents the time at which the test was interrupted and leakage of air did not occur in any of the wheel and tire assemblies with the ring body 8 thereon according to the present invention even at the time of interruption of the test.

On the other hand, the marking "x" at one end of each of the broken lines in the graph of FIG. 14 represents the time at which the test was interrupted and leakage of air occurred in any of the wheel and tire assemblies without the ring body 8 thereon at the time of interruption of the test.

Each of arrow-headed lines shown below the axis of abscissa of the graph of FIG. 14 represents the time at which the test was started.

From the foregoing description, it has now become clear that the wheel and tire assembly according to the present invention is effective and advantageous, as compared with the prior art wheel and tire assembly, in that no substantial displacement of one or both of the bead portions of the tire in a direction perpendicular to the midcircumferential plane of the tire will occur and, therefore, no bead portion of the tire will fall into the rim well. In addition, no leakage of air from between one of the bead portions of the tire and the corresponding rim flange and also from a gap which may otherwise become present in the rim well will occur. Moreover, mounting and removal of the ring body can readily be performed. It is to be noted that the ring body 8 suffices to be inflated to such an extent as to provide a substantial barrier for the displacement of one or both of the bead portions of the tire in the direction perpendicular to the mid-circumferential plane of the tire.

Although the present invention has fully been described by way of example, it should be noted that various changes and modifications will be apparent to those skilled in the art and, therefore, such changes and modifications are to be understood as included within the true scope of the present invention unless they depart therefrom.

What is claimed is:

1. A tire and wheel assembly which comprises a pneumatic tire having bead portions each contiguous to and on one side of said pneumatic tire; a wheel structure having a rim assembly on the outer periphery thereof for the support of said pneumatic tire thereon, said rim assembly including a radially inwardly recessed rim well, a pair of opposed, radially outwardly extending rim flanges on respective sides of said rim well and a pair of flat side portions each between the rim well and a corresponding one of the rim flanges, said pneumatic tire being mounted on said wheel structure with said bead portions held in tight contact with and flat against the rim flanges; and a substantially inflatable ring having radially outer and inner portions, said inflatable ring being mounted on said wheel structure and within said pneumatic tire on said wheel structure, and being thick enough such that it substantially fills said well portion when said ring is in a deflated condition, with said radially inner portion being seated within said rim well, said radially outer portion being, when said inflatable ring is not inflated, held substantially flush with the plane of said flat side portions, said radially outer portion of said inflatable ring being, when said inflatable ring is inflated, radially outwardly enlarged to assume such a shape in cross section as to prevent at least one of said bead portions of said pneumatic tire from being displaced and falling into said rim well in the event of deflation of said pneumatic tire.

2. A tire and wheel assembly as claimed in claim 1, wherein said inflatable ring is formed with at least one cavity substantially circumferentially extending in said inflatable ring, and includes a valve through which pneumatic medium is adapted to be supplied into said cavity to inflate said inflatable ring.

3. A tire and wheel assembly as claimed in claim 2, wherein said radially outer portion of said inflatable ring has an outer surface lined with a layer of reinforcement.

* * * * *